United States Patent
Boulanov et al.

(10) Patent No.: US 8,869,567 B2
(45) Date of Patent: Oct. 28, 2014

(54) FIBRE-FORMING CENTRIFUGE, DEVICE AND METHOD FOR FORMING MINERAL FIBRES

(75) Inventors: Oleg Boulanov, Nogent sur Oise (FR); Jean-Luc Bernard, Breuil le Vert (FR)

(73) Assignee: Saint-Gobain Isover, Courbevoie (FR)

( * ) Notice: Subject to any disclaimer, the term of this patent is extended or adjusted under 35 U.S.C. 154(b) by 148 days.

(21) Appl. No.: 13/517,199

(22) PCT Filed: Dec. 10, 2010

(86) PCT No.: PCT/FR2010/052665
§ 371 (c)(1),
(2), (4) Date: Jun. 21, 2012

(87) PCT Pub. No.: WO2011/083227
PCT Pub. Date: Jul. 14, 2011

(65) Prior Publication Data
US 2012/0270718 A1    Oct. 25, 2012

(30) Foreign Application Priority Data
Dec. 22, 2009    (FR) ...................................... 09 59393

(51) Int. Cl.
*C03B 37/04* (2006.01)
(52) U.S. Cl.
CPC .................................... *C03B 37/045* (2013.01)
USPC .................... 65/522; 65/521; 65/459; 65/460
(58) Field of Classification Search
CPC .... C03B 37/04; C03B 37/041; C03B 37/042; C03B 37/043; C03B 37/044; C03B 37/045; C03B 37/046; C03B 37/047; C03B 37/048
USPC ..................................... 65/459–461, 521–523
See application file for complete search history.

(56) References Cited

U.S. PATENT DOCUMENTS 3,020,586 A * 2/1962 Charpentier et al. ........... 65/522
3,152,878 A * 10/1964 Levecque et al. ............... 65/523
(Continued)

FOREIGN PATENT DOCUMENTS

EP    0 583 792    2/1994

OTHER PUBLICATIONS

International Search Report Issued May 4, 2011 in PCT/FR10/52665 Filed Dec. 10, 2010.

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

A centrifuge to rotate about a rotation axis, the centrifuge including: an annular wall pierced with a plurality of holes, the annular wall having the rotation axis as its axis of symmetry; and a row of one continuous relief or of discontinuous reliefs, situated on an outer surface of the centrifuge, on the annular wall and/or above and close to the annular wall when the centrifuge is in a centrifuging position, the row being horizontal or inclined at an angle of more than 0° and less than 90° relative to the horizontal when the centrifuge is in the centrifuging position. The centrifuge makes it possible to improve energy consumption of a device for forming mineral fibers furnished with the centrifuge.

11 Claims, 3 Drawing Sheets

(56) References Cited

U.S. PATENT DOCUMENTS

| | | | |
|---|---|---|---|
| 3,252,777 A * | 5/1966 | Levecque et al. | 65/509 |
| 3,622,293 A | 11/1971 | Firnhaber | |
| 4,270,943 A * | 6/1981 | Riddell et al. | 65/521 |
| 5,554,324 A | 9/1996 | Bernard et al. | |
| 5,601,628 A | 2/1997 | Battigelli et al. | |
| 6,158,249 A * | 12/2000 | Battigelli et al. | 65/522 |
| 6,596,048 B1 * | 7/2003 | Tuffal et al. | 55/527 |
| 2005/0191590 A1 * | 9/2005 | Boulanov et al. | 431/350 |

* cited by examiner

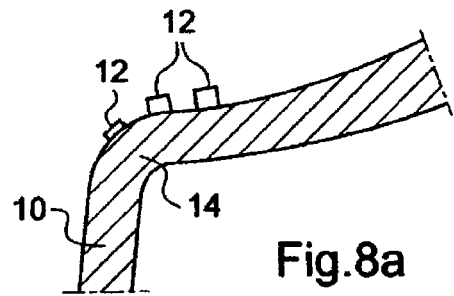
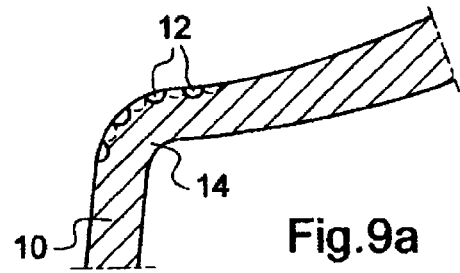
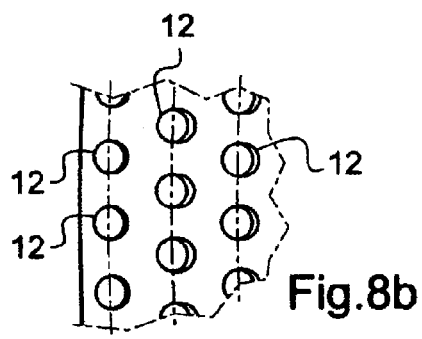
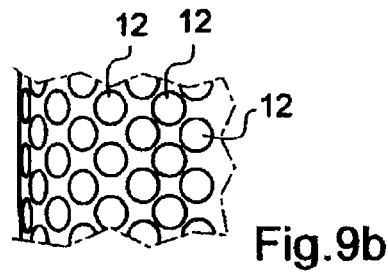
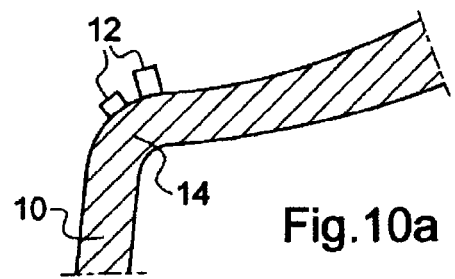
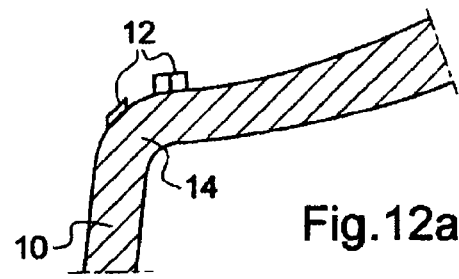
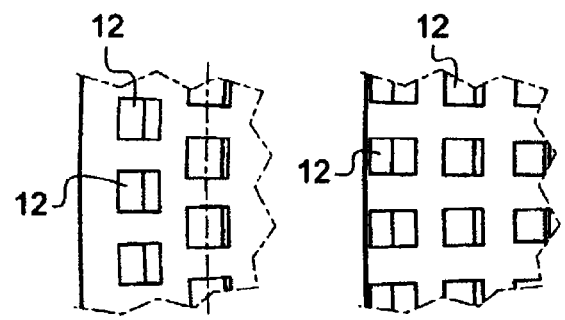
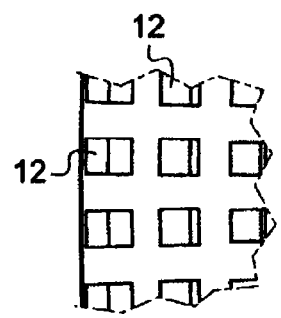
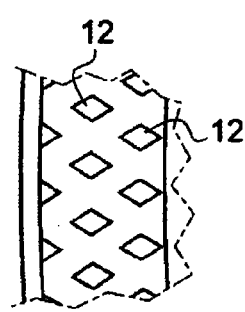

FIBRE-FORMING CENTRIFUGE, DEVICE AND METHOD FOR FORMING MINERAL FIBRES

The invention relates to a fibre-forming centrifuge, also called a fibre-forming spinner, which makes it possible to form mineral fibres or other thermoplastic materials by an internal centrifuging method associated with an attenuation via a high-temperature gaseous current. It applies notably to the industrial production of glass wool designed to be involved for example in the composition of thermal and/or acoustic insulation products.

A trickle of molten glass is inserted into a fibre-forming centrifuge rotating at high speed and pierced on its periphery with a very large number of holes through which the glass is sprayed in the form of filaments under the effect of the centrifugal force. These filaments are then subjected to the action of an annular attenuation current at high temperature and speed sweeping the wall of the centrifuge, a current which thins them and converts them into fibres. The formed fibres are drawn by this gaseous attenuation current to a receiving device usually consisting of a gas-permeable strip. This method is called "internal centrifuging".

This method has been the subject of many enhancements relating notably for some of them to the fibre-forming spinner, for others of them to the means for generating the annular attenuation current, for example by virtue of burners of a particular type. See notably documents EP-B-0 189 354, EP-B-0 519 797, WO-A-97/15532 concerning the latter point.

With respect to the fibre-forming spinner, document FR-A-1 382 917 describes a fibre-forming member the principle of which is still abundantly used: the molten material is brought into a basket comprising, on its vertical wall, holes through which the material is sprayed onto the wall of a rotating body secured to the basket and comprising a large number of holes. This wall is called the "strip" of the fibre-forming spinner. In order to obtain quality fibre-forming, the holes are distributed in annular rows and the diameters of the holes are variable depending on the row to which they belong, this diameter becoming smaller from the top of the strip to its bottom portion.

Enhancements have been made to this basic principle as disclosed notably in document FR-A-2 443 436, in which means make it possible to obtain a laminar flow of the molten material from the top to the bottom of the strip of the spinner.

Another modification, described in document EP-A-1 370 496, was made to improve the quality of the fibres and increase efficiency. It involves distributing the holes of the strip in a plurality of annular zones placed one above the other with at least two annular zones having a number of holes per unit of surface area that is different from a value greater than or equal to 5%.

In all of these examples, the peripheral strip of the spinner is heated both by the molten glass that is centrifuged into the fibre-forming spinner and by the hot air blown by the burner generating the annular attenuation current.

However, the heating by the burner is a source of considerable energy consumption.

There is therefore a need for a fibre-forming centrifuge which makes it possible to improve the energy consumption of a fibre-forming device furnished with this centrifuge.

For this, the invention proposes a fibre-forming centrifuge suitable for rotating about a rotation axis, the centrifuge comprising:
   an annular wall pierced with a plurality of holes, the annular wall having the rotation axis as its axis of symmetry,
   at least one row of one continuous relief or of discontinuous reliefs, situated on the outer surface of the centrifuge, on the annular wall and/or above and close to the annular wall when the centrifuge is in centrifuging position, the row being horizontal or inclined at an angle of more than 0° and less than 90° relative to the horizontal when the centrifuge is in centrifuging position.

According to another particular feature, the centrifuge comprises at least two rows of a continuous relief and/or of discontinuous reliefs, the rows being parallel with one another.

According to another particular feature, the discontinuous reliefs of two adjacent rows are placed in staggered rows.

According to another particular feature, the discontinuous reliefs of two adjacent rows are aligned radially.

According to another particular feature, the distance between two adjacent discontinuous reliefs of a row is constant.

According to another particular feature, the discontinuous reliefs are studs and/or ribs and/or semi-spherical cavities and/or grooves of semicircular section.

According to another particular feature, the studs of one and the same row have a round, square, triangular or diamond-shaped section or else have a pyramid shape and in which the ribs of one and the same row have a rounded, square, triangular or trapezoidal section.

According to another particular feature, the height of the stud or of the rib ranges between 1 and 5 mm and the section halfway up the stud ranges between 1 and 3 mm.

According to another particular feature, the diameter of the semi-spherical cavity ranges between 1 and 4 mm and in which the diameter of the semicircular section of the grooves range between 1 and 4 mm.

According to another particular feature, the continuous relief is a groove of semicircular section or a rib of rounded, square, triangular or trapezoidal section and in which the diameter of the semicircular section of the grooves ranges between 1 and 4 mm and the height of the ribs ranges between 1 and 5 mm.

The invention also proposes a device for forming mineral fibres comprising:
   a fibre-forming centrifuge as described above,
   an annular burner generating a high-temperature gaseous attenuation jet,
   the outlet of the annular burner being situated above the relief(s) of the centrifuge in the fibre-forming position and the gaseous attenuation jet being tangential to the annular wall of the centrifuge.

The invention also proposes a method for forming mineral fibres by internal centrifuging associated with a high-temperature gaseous attenuation using the mineral fibre-forming device described above, in which the material to be formed into fibre is poured into the centrifuge.

The invention also proposes a use of the mineral fibres obtained by the mineral fibre-forming device described above and according to the mineral fibre-forming method described above for manufacturing thermal and/or acoustic insulation products.

Other features and advantages of the invention will now be described with respect to the drawings in which:

FIGS. 8a and 8b represent respectively a view in cross section and a top view of a detail of the centrifuge comprising three rows of cylindrical studs, the studs of two adjacent rows being staggered;

FIGS. 9a and 9b represent respectively a view in cross section and a top view of a detail of the centrifuge comprising eight rows of semi-spherical cavities, the semi-spherical cavities of two adjacent rows being staggered;

FIGS. 10a and 10b represent respectively a view in cross section and a top view of a detail of the centrifuge comprising two rows of studs of square section, the studs of two adjacent rows being staggered and of different height;

FIG. 11 represents a top view of a detail of the centrifuge comprising three rows of studs of square section, the studs of two adjacent rows being aligned radially;

FIGS. 12a and 12b represent respectively a view in cross section and a top view of a detail of the centrifuge comprising two rows of studs of diamond-shaped section and a row of studs of triangular section, the studs of two adjacent rows being staggered.

The reference numbers that are identical in the various figures represent identical or similar elements.

Figure 1:
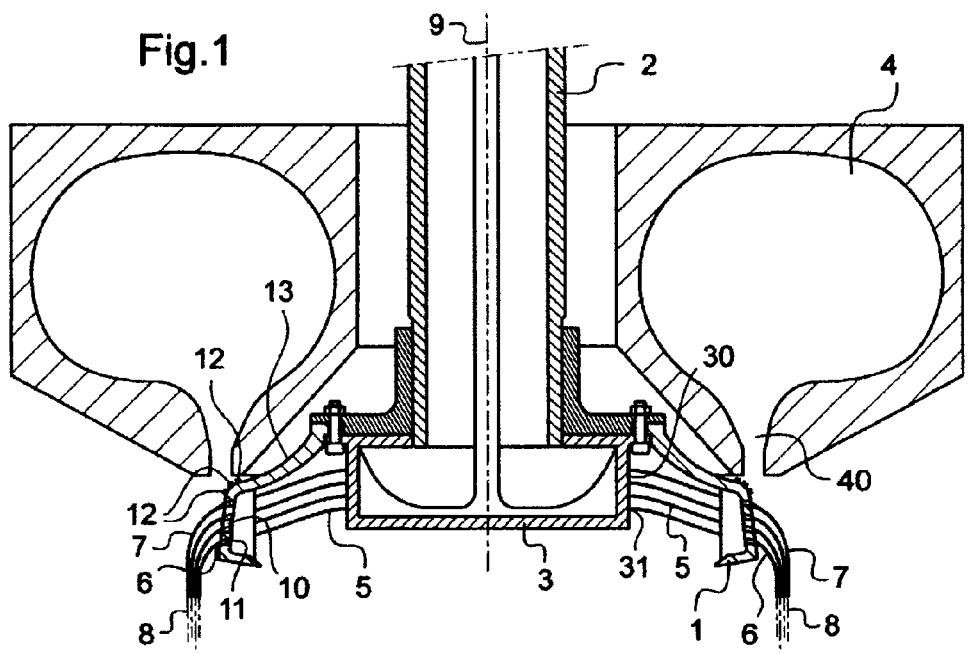
FIG. 1 represents a view in section of a mineral fibre-forming device according to the invention.
Figure 2:
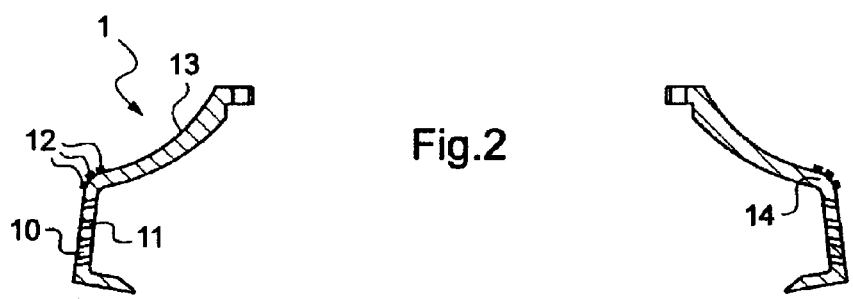
FIG. 2 represents a view in section of a fibre-forming centrifuge according to the invention.

The "top", the "bottom", the "upperside" and the "underside" are defined relative to a vertical axis when the centrifuge is in centrifuging position, that is to say when the rotation axis of the centrifuge is on a vertical axis, as in FIGS. 1 and 2.

The invention relates to a fibre-forming centrifuge capable of rotating about a rotation axis. The centrifuge comprises an annular wall pierced with a plurality of holes. This annular wall is symmetrical relative to the rotation axis of the centrifuge. The centrifuge also comprises a row of a continuous relief or of discontinuous reliefs which is situated on the outer surface of the centrifuge, on the annular wall and/or above and close to the annular wall when the centrifuge is in centrifuging position. The row is horizontal or inclined at an angle of more than 0° and less than 90° relative to the horizontal when the centrifuge is in centrifuging position.

Therefore, the row of a continuous relief or of discontinuous reliefs is close to the outlet of the burner, in the gas jet that comes out of the burner. The reliefs create turbulence which makes it possible to mix the gas close to the reliefs, which helps to improve the heat exchanges between the outlet of the burner and the surface of the centrifuge, in particular the annular wall of the centrifuge. Therefore, for a burner heating power that is identical to a centrifuge without reliefs, the temperature of the annular wall of the centrifuge is increased. Similarly, by reducing the heating power of the burner, an identical temperature of the annular wall of the centrifuge compared with a centrifuge without reliefs can be obtained.

The energy consumption of the fibre-forming device comprising such a centrifuge if therefore improved.

The centrifuge according to the invention is designed to be incorporated into a mineral fibre-forming device.

FIG. 1 represents a view in section of a mineral fibre-forming device according to the invention.

The mineral fibre-forming device comprises a centrifuge 1 comprising an annular wall 10 pierced with a plurality of holes 11. The centrifuge also comprises a web 13. The web 13 forms the upper side of the centrifuge 1, between the annular wall and the tulip. The mineral fibre-forming device also comprises a shaft 2 with an axis 9 designed to be rotated by a motor (not shown). The centrifuge 1 is attached to the shaft 2 via the tulip which is in line with the web. When the mineral fibre-forming device is in fibre-forming position, the axis 9 is vertical.

The shaft 2 is hollow. At its top end, the shaft 2 is connected to means for supplying molten glass. At its bottom end, the shaft 2 is connected to a basket 3. The basket 3 is situated inside the centrifuge 1 as can be seen in FIG. 1. The basket 3, attached to the shaft 2, is designed to be rotated with the centrifuge 1 and the shaft 2. The basket 3 comprises an annular wall 30 pierced with a plurality of holes 31.

When the mineral fibre-forming device is in operation, the centrifuge 1, the shaft 2 and the basket 3 are rotated about the axis of the shaft 2. Molten glass flows into the shaft 2 from the means for supplying molten glass, to the basket 3, in which the molten glass spreads out. Under the effect of the rotation, the molten glass is sprayed onto the annular wall 30 of the basket 3, passes through the plurality of holes 31 (with a diameter ranging between approximately 1.5 mm and 3 mm) of the basket 3 and, in the form of voluminous filaments 5 (of the order of 2 mm diameter), is sprayed onto the peripheral wall 10, usually called the "strip" of the centrifuge 1. A permanent reserve of molten glass is then formed in the centrifuge in order to supply the plurality of holes 11 pierced in the annular wall 10 of the centrifuge 1. Molten glass passes through the plurality of holes 11 (of diameter ranging between approximately 0.5 mm and 1 mm) of the centrifuge 1 in order to form flow cones 6 extending into pre-fibres 7.

The mineral fibre-forming device also comprises at least one annular burner 4 generating a high-temperature gaseous attenuation jet. The gaseous attenuation jet is a high-temperature (typically 1350° C. to 1600° C.) gaseous current which comes out of the annular burner 4 through its outlet 40 so that the gaseous attenuation jet is tangential to the annular wall 10 of the centrifuge 1. In fibre-forming position, the outlet 40 of the annular burner 4 is situated above the annular wall 10 of the centrifuge 1.

The annular burner is for example according to the disclosures of documents EP-A-0 189 354, EP-A-0 519 797 or EP-A-1 474 636 of the applicant. Under the action of the gaseous attenuation jet, the pre-fibres 7 are attenuated, their terminal portion generating discontinuous fibres 8 that are then collected under the centrifuge.

The fibre-forming device also optionally comprises an induction ring under the centrifuge and/or an internal burner (not shown) in order to heat the lowest zone of the centrifuge and prevent or limit the creation of a temperature gradient over the height of the centrifuge.

FIG. 2 represents a view in section of a centrifuge 1 according to the invention.

As mentioned above, the centrifuge 1 is suitable for rotating about a rotation axis 9 and comprises an annular wall 10 pierced with a plurality of holes 11. The annular wall 10 has the rotation axis 9 of the centrifuge as its axis of symmetry. The plurality of holes 11 makes it possible to form the flow cones 6 which are attenuated as pre-fibres 7, then become fibres 8 under the effect of the gaseous attenuation jet as explained above.

Many parameters have an influence on the dimensions and the tensile strength of the fibres, which determine the quality of the fibres. Various fibre qualities can be of value to use depending on the applications. For example, for applications requiring a good compression resistance or else good acoustics, short, brittle fibres will be preferred. On the other hand, for applications requiring good heat resistance, long, silky fibres will be preferred. The parameters that have an influence on the quality of the fibres are, amongst other things, the composition of the fibres, the temperature of the annular wall 10 of the centrifuge 1 and the temperature of the gaseous attenuation jet originating from the outlet 40 of the annular burner 4. The gaseous attenuation jet originating from the outlet 40 of the annular burner 4 is used both to heat the annular wall 10 and to attenuate the fibres. The annular wall 10 is also heated by the molten glass that accumulates against the inner wall of the annular wall 10. The temperature of the annular wall 10 of the centrifuge 1 therefore depends on both the temperature of the molten glass that accumulates in the centrifuge and on the temperature of the gaseous attenuation jet.

The temperature of the annular wall 10 of the centrifuge 1 must be high enough to prevent the molten glass from crystallizing in the holes 11 of the annular wall 10. Otherwise, the holes 11 might become blocked and the centrifuge 1 will quickly become unusable.

The temperature of crystallization of the glass depends on its chemical composition. In particular, for fibres with a high alumina content, the crystallization temperature is high. The higher the crystallization temperature, the higher must be the temperature of the annular wall of the centrifuge. A very high temperature of the gaseous attenuation jet requires a great deal of energy and weakens the outer surface of the centrifuge. Moreover, a high temperature of the gaseous attenuation jet makes it possible to manufacture only short, brittle fibres. To be able to manufacture long, silky fibres, it is important for the temperature of the gaseous attenuation jet to be not too high. It is therefore important to be able to transmit the heat as well as possible from the gaseous attenuation jet to the surface of the annular wall 10 of the centrifuge 1 in order to prevent the temperature of the gaseous attenuation jet being too high while ensuring a sufficient temperature at the annular wall 10 of the centrifuge 1 to prevent the crystallization.

For fibres with a smaller alumina content, the centrifuge according to the invention is also of value since it makes it possible to manufacture long, silky fibres while saving energy.

In order to improve the heat transfer from the gaseous attenuation jet to the surface of the annular wall 10 of the centrifuge 1, the centrifuge 1 comprises, on its outer surface, a continuous relief or several discontinuous reliefs 12. This relief or these reliefs or asperities makes/make it possible to improve the heat exchanges between the atmosphere surrounding the centrifuge 1, close to the relief(s), and the surface of the centrifuge, also close to the relief(s). Improving the heat exchange makes it possible to reduce the temperature of the attenuation gas jet without the temperature of the annular wall 10 being reduced. Thus, for one and the same annular wall temperature, the heat exchange at the relief(s) or asperity (asperities) of the centrifuge can be increased by up to 40% with a centrifuge according to the invention.

The centrifuge 1 comprises a rounding 14 between the annular wall 10 and the web 13. The relief(s) 12 is(are) placed on the zone on which the burner acts on the centrifuge 1, namely the zone of the centrifuge that is heated by the gaseous attenuation jet. The continuous relief and/or the discontinuous reliefs is(are) thus placed in at least one row on the annular wall 10 and/or above the annular wall 10 when the centrifuge 1 is in centrifuging position. Therefore, preferably, at least one row of a continuous relief and/or of discontinuous reliefs 12 is placed on the rounding 14 between the annular wall 10 and the web 13 and/or on the annular wall 10. The other rows of a continuous relief and/or of discontinuous reliefs may be placed on the web 13, close to the row placed on the rounding 14, as shown in FIGS. 1 and 2 and/or on the annular wall 10. All of the reliefs are therefore on or close to the annular wall 10 of the centrifuge 1. Each row is annular, namely horizontal when the centrifuge is in centrifuging position, or inclined at an angle of more than 0° and less than 90° relative to the horizontal when the centrifuge is in the centrifuging position.

The relief(s) 12 is(are) therefore close to the outlet 40 of the annular burner 4 which is situated slightly above the annular wall 10 of the centrifuge 1 (as can be seen in particular in FIG. 1), the burner blowing a gaseous current tangential to the annular wall 10. The relief(s) is(are) therefore perfectly placed to improve the heat exchange between the gas leaving the annular burner 4 and the annular wall 10 of the centrifuge.

The centrifuge 1 preferably comprises several rows of a continuous relief and/or of discontinuous reliefs which are parallel with one another. This makes it possible to improve the heat exchange relative to a centrifuge with a single row. For one and the same temperature of the attenuation jet at the outlet 40 of the annular burner 4, the temperature of the annular wall is thus higher (therefore the annular wall is better heated) if the centrifuge comprises several rows of reliefs rather than only one. If the centrifuge comprises at least two rows, there may be at the same time one or more rows of a continuous relief and one or more rows of discontinuous reliefs. If the centrifuge comprises several rows, at least one of the rows is horizontal or inclined at an angle of more than 0° and less than 90° relative to the horizontal and another row can be vertical in fibre-forming position.

Preferably, in the case of discontinuous reliefs, the distance between two adjacent reliefs 12 of one and the same row is constant. Since the discontinuous reliefs 12 are distributed evenly, the heat exchange between the high-temperature gaseous current coming out of the annular burner 4 and the outer surface of the annular wall 10 of the centrifuge is as uniform as possible over the whole periphery of the annular wall 10.

Similarly, when the centrifuge comprises several rows of a continuous relief and/or of discontinuous reliefs, the distance between two adjacent rows is constant, which also makes it possible to make the heat exchange uniform.

As explained above, there is a temperature gradient between the gas originating from the annular burner 4 and the air situated close to the outer surface of the centrifuge 1. The reliefs cause turbulence in the gaseous attenuation jet which allows a mixing of the gas originating from the annular burner 4 and of the air situated close to the outer surface of the centrifuge 1. This mixing makes it easier to exchange heat between the gas of the annular burner 4 and the outer surface of the centrifuge, close to the reliefs, hence on or close to the annular wall 10 of the centrifuge 1. This mixing occurs over a determined height above the outer surface of the centrifuge 1, a height which depends, amongst other things, on the shape and the dimensions of the reliefs, on the positioning of the reliefs relative to one another and on the distance between them.

The relief or reliefs or asperity or asperities are protruding from or sunk into the outer surface of the centrifuge. The relief or reliefs or asperity or asperities that are sunk in do not pass through in order to maintain a good mechanical strength of the centrifuge.

Therefore, the discontinuous relief(s) or asperity (asperities) is(are) for example studs, semi-spherical cavities, ribs or else grooves. A row of discontinuous reliefs may comprise reliefs of one or more of these four categories: studs and/or semi-spherical cavities and/or ribs and/or grooves.

The discontinuous reliefs may have various shapes depending on the result sought: to heat the rounding 14 better or to disrupt the gaseous attenuation jet less. Therefore, the discontinuous grooves preferably have, in cross section, the shape of a semicircle. The diameter of the semicircle ranges preferably between 1 mm and 4 mm. The discontinuous ribs have, in cross section, any type of shape, for example square, triangular, round or trapezoidal. The height of the rib ranges preferably between 1 mm and 5 mm.

A continuous relief is for example a single groove which runs all round the centrifuge and which, in cross section, has the shape of a semicircle or else a single rib which runs all round the centrifuge and which, in cross section, has a square, triangular, round or trapezoidal shape. The diameter of the semicircle ranges preferably between 1 mm and 4 mm. The height of the rib ranges preferably between 1 mm and 5 mm.

Figure 3:
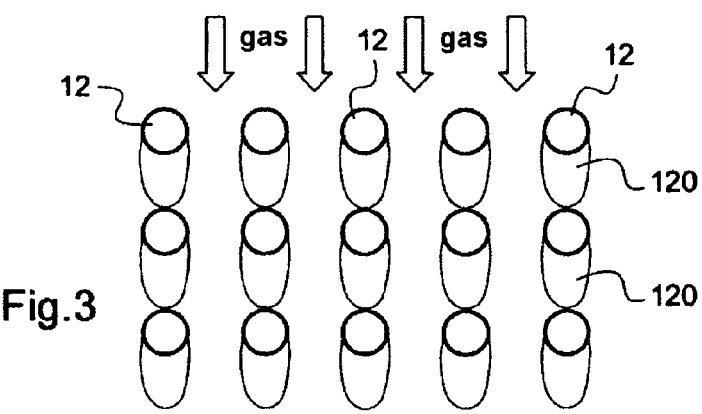
FIG. 3 represents a top view flattened out of three rows of cylindrical reliefs, the reliefs of two adjacent rows being aligned radially.

FIG. 3 represents a top view flattened out of three rows of cylindrical discontinuous reliefs. In this figure, the discontinuous reliefs 12 of two adjacent rows are aligned radially. It can be seen that the zones of turbulence of three discontinuous reliefs 12 aligned radially overlap partially, which makes it possible to increase the heat exchange radially.

When the discontinuous reliefs are studs, as for example in FIGS. 1, 2, 5, 8*a*, 8*b*, 10*a*, 10*b*, 11 and 12, the studs form an obstacle to the attenuation and slow down the gas originating from the burner. There is then, downstream of the studs, a plurality of disrupted zones, situated in line with the studs, and a plurality of undisrupted zones, situated between the studs. The speed of the gas is slower in the disrupted zones than in the undisrupted zones. The higher the speed, the thinner the fibres because they are more attenuated and, conversely, the slower the speed, the fatter the fibres because they are less attenuated. Therefore, when the rows of studs are aligned radially, the fibres have a non-uniform size after fibre-forming.

Figure 4:
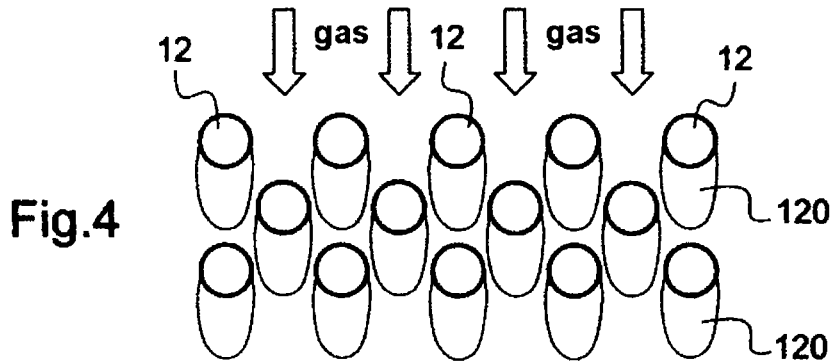
FIG. 4 represents a top view flattened out of three rows of cylindrical reliefs, the reliefs of two adjacent rows being staggered.

FIG. 4 represents a top view flattened out of three rows of cylindrical discontinuous reliefs. In this figure, the discontinuous reliefs of two adjacent rows are staggered. This embodiment is preferred to that of FIG. 3. In this embodiment, the turbulence does not overlap. On the other hand, the heat exchange is uniform over the whole surface occupied by the reliefs.

In this configuration, when the discontinuous reliefs are studs, the gas is slowed down everywhere in a uniform manner. Thus, the fibres are attenuated uniformly and have a uniform size after fibre-forming.

In the configuration of FIGS. 3 and 4, when the discontinuous reliefs are semi-spherical cavities, as for example in FIGS. 6, 7, 9*a* and 9*b*, the attenuation gas is not slowed down by obstacles. Hence, for one and the same temperature of attenuation gas, the fibres will be thinner after fibre-forming with a centrifuge furnished with semi-spherical cavities than with a centrifuge furnished with studs.

On the other hand, in the case of semi-spherical cavities, the heat exchange is not quite so good as for the studs, since the surface area of exchange is smaller. In order to have the same temperature of annular wall, it is therefore necessary to ensure that the temperature of the burner is slightly higher than that necessary when the reliefs are studs.

The distance between two adjacent discontinuous reliefs of one and the same row ranges preferably between 1 mm and 5 mm, for example between 2 and 5 mm, which makes it possible to prevent the gas from passing close to the reliefs without being caught in a turbulence, in particular for the embodiment of FIG. 4.

Similarly, when the centrifuge comprises several rows, the distance between two adjacent rows ranges preferably between 1 mm and 5 mm, for example between 2 and 5 mm, which allows an overlap of the zones of turbulence, in particular for the embodiment of FIG. 3.

The heat exchange depends on several magnitudes, in particular:
the surface area of heat exchange, hence the shape and the height or the depth of the reliefs;
the temperature gradient, hence the height of the relief and/or the height of the zone of turbulence above the outer surface of the centrifuge;
the coefficient of heat exchange, which depends on the dimensions of the zone of turbulence and on the hydrodynamic forces involved in the zone of turbulence.

Figure 5:
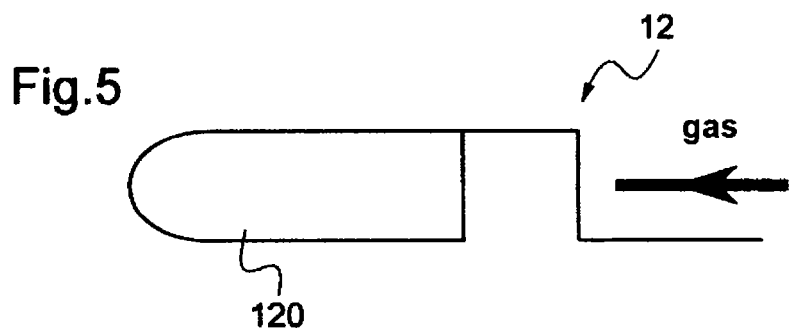
FIG. 5 represents a view in vertical section (when the centrifuge is in centrifuging position) of a relief in the form of a stud.

FIG. 5 shows a view in longitudinal section of a discontinuous relief in the form of a stud.

In this embodiment, the discontinuous reliefs protrude. They are either machined into the outer surface of the centrifuge during its manufacture, or fitted and attached to the outer surface of the centrifuge, for example by welding. The latter solution makes it possible to adapt a centrifuge without relief in order to obtain a centrifuge according to the invention.

The higher the studs, the more they make it possible to mix the gas over a great height, which therefore increases the temperature gradient. However, the size of the studs must be limited so as not to slow down the gaseous attenuation jet too much so that the fibres form correctly, in particular when the studs are placed in a staggered pattern. Preferably, the height of each stud ranges between 1 and 5 mm, for example between 2 and 5 mm.

The studs of one and the same row preferably all have the same shape. They are of round section (for example in FIGS. 8*a* and 8*b*), square section (as in FIGS. 10*a*, 10*b* and 11), triangular and/or diamond-shaped section (as in FIGS. 12*a* and 12*b*) or else have a pyramid shape. The section half-way up the stud preferably ranges between 1 and 3 mm, for example between 2 and 3 mm. The shape has a great influence on the surface area of heat exchange.

Preferably, the studs of the row that is closest to the annular wall 10 of the centrifuge 1 are less high than the studs of the other rows (as shown in FIGS. 1, 2, 8*a*, 10*a* and 12), in order to limit the degree to which the studs slow down the gaseous attenuation jet.

FIG. 5 also shows the zone of turbulence 120 generated by a stud. It is situated downstream of the stud.

Figure 6:
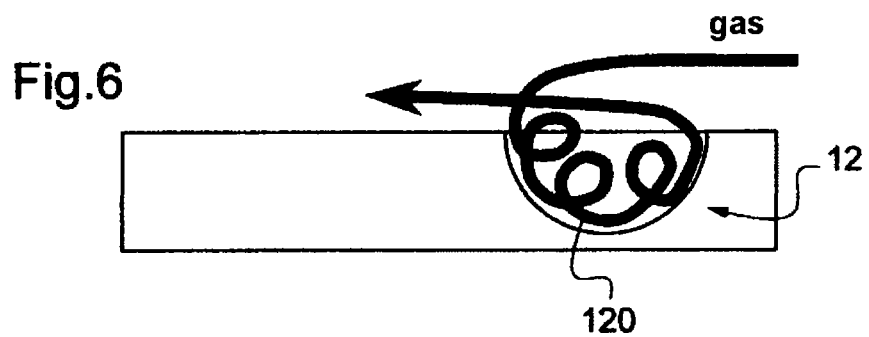
FIG. 6 represents a view in cross section of a relief in the form of a semi-spherical cavity.

FIG. 6 represents a view in cross section of a discontinuous relief in the form of a semi-spherical cavity.

In this embodiment, the discontinuous reliefs are hollow. They are hollowed out by machining into the outer surface of the centrifuge.

The diameter of each cavity preferably ranges between 1 mm and 4 mm, for example between 2 and 4 mm.

FIG. 6 also shows a zone of turbulence 120 generated by a semi-spherical cavity. It can be seen that the gas enters the semi-spherical cavity and that the zone of turbulence covers a certain height above the semi-spherical cavity and extends downstream of the semi-spherical cavity.

Figure 7:
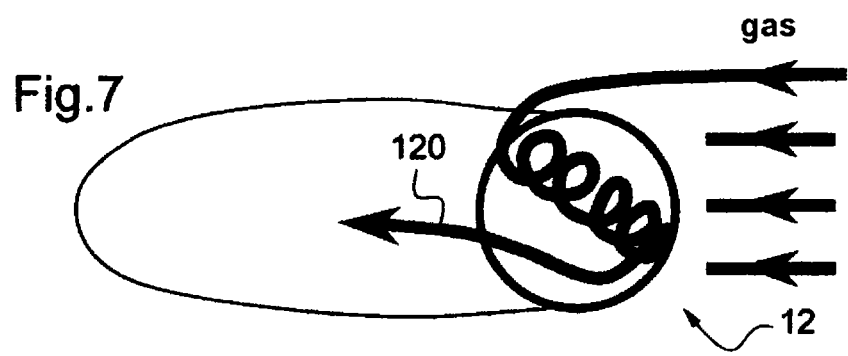
FIG. 7 represents a top view of a relief in the form of a semi-spherical cavity.

FIG. 7 shows a detailed top view of a discontinuous relief in the form of a semi-spherical cavity.

FIG. 7 shows the gas movements in and downstream of the semi-spherical cavity.

The shapes and dimensions of the reliefs are adapted according to the operating conditions of the fibre-forming device. They depend for example on the thickness of the centrifuge wall. The studs may therefore have different shapes. The shape of the studs is a compromise between the difficulty of machining and the result sought with reference to energy consumption.

Centrifuges according to various embodiments of the invention have been tested. The following embodiments have given the good results set out below.

The embodiment of the invention comprising two rows of studs of square section placed in a staggered pattern and having a different height (FIGS. 10a and 10b) helps to improve the heat exchange at the reliefs of the centrifuge by approximately 40%.

The embodiment of the invention comprising eight rows of semi-spherical cavities placed in a staggered pattern (FIGS. 9a and 9b) make it possible to improve the heat exchange at the reliefs of the centrifuge by 20-25% depending on the radius of the cavity.

The studs specifically allow a greater heat exchange between the gas jet originating from the burner and the outer surface of the centrifuge than the semi-spherical cavities. But the semi-spherical cavities make it possible to attenuate the fibres better.

The embodiment of the invention comprising one row of triangles close to the annular wall and two rows of diamonds placed in a staggered pattern makes it possible to improve the heat exchange at the reliefs of the centrifuge by approximately 30%.

The invention also relates to a device for forming mineral fibres as explained above. The device comprises the centrifuge 1 according to the invention and an annular burner 4 generating a high-temperature gaseous attenuation jet so that the outlet 40 of the annular burner is situated above the relief(s) 12 of the centrifuge 1 in fibre-forming position and so that the gaseous attenuation jet is tangential to the annular wall 10 of the centrifuge 1.

The gaseous attenuation jet is suitable at the same time for heating the centrifuge and attenuating the fibres. The relief(s) make(s) it possible to improve the energy transfer between the gas of the burner and the centrifuge. Thus the device for forming mineral fibres has an improved energy consumption.

Moreover, since the energy transfer is improved, the ambient air is less hot which makes it possible to increase the service life of the centrifuge.

Moreover, since the power of the burner is reduced, there is less ambient air drawn in by the gas of the burner and less energy is required to draw the fibres towards the fibre-receiving mat for their subsequent use.

The invention also relates to a method for forming mineral fibres by internal centrifuging associated with a high-temperature gaseous attenuation. This method uses the device according to the invention in which the material to be formed into fibre is poured to the centrifuge 1. The use of the centrifuge according to the invention therefore makes it possible to improve the energy consumption of the method.

The invention also relates to the use of the mineral fibres obtained by the mineral fibre-forming device according to the invention and according to the mineral fibre-forming method according to the invention in order to manufacture thermal and/or acoustic insulation products. The use of the centrifuge according to the invention therefore makes it possible to manufacture mineral fibres of better quality, since the temperature of the gaseous attenuation jet of the annular burner can be reduced with less energy consumption.

The invention claimed is:

1. A device for forming mineral fibers comprising:
a fiber-forming centrifuge to rotate about a rotation axis, the centrifuge comprising:
an upper side of the centrifuge;
an annular wall pierced with a plurality of holes, the annular wall having the rotation axis as its axis of symmetry;
a rounding positioned between the annular wall and the upper side;
at least one row of one continuous relief or of discontinuous reliefs situated on an outer surface of the centrifuge, wherein at least one row of continuous or discontinuous reliefs extends, when the centrifuge is in a centrifuging position, along the annular wall, the rounding, or along the upper side of the centrifuge, close to the rounding; and
an annular burner generating a high-temperature gaseous attenuation jet,
wherein an outlet of the annular burner is situated above the at least one row of one continuous relief or of discontinuous reliefs of the centrifuge in a fiber-forming position, the gaseous attenuation jet is tangential to the annular wall of the centrifuge, and the at least one row of continuous or discontinuous reliefs are in the high-temperature gaseous attenuation jet that comes out of the burner, and
wherein the at least one row is horizontal or inclined at an angle of more than 0° and less than 90° relative to the horizontal when the centrifuge is in the centrifuging position.

2. The device according to claim 1, comprising at least two rows of a continuous relief and/or of discontinuous reliefs, the rows being parallel with one another.

3. The device according to claim 2, in which the discontinuous reliefs of two adjacent rows are placed in staggered rows.

4. The device according to claim 2, in which the discontinuous reliefs of two adjacent rows are aligned radially.

5. The device according to claim 1, in which a distance between two adjacent discontinuous reliefs of a row is constant.

6. The device according to claim 1, in which the discontinuous reliefs are studs and/or ribs and/or semi-spherical cavities and/or grooves of semicircular section.

7. The device according to claim 6, in which studs of one and the same row have a round, square, triangular, or diamond-shaped section or have a pyramid shape, and in which the ribs of one and the same row have a rounded, square, triangular, or trapezoidal section.

8. The device according to claim 6, in which a height of the studs or of the ribs ranges between 1 and 5 mm and a section halfway up the studs is between 1 and 3 mm.

9. The device according to claim 6, in which a diameter of the semi-spherical cavity is between 1 and 4 mm, and in which a diameter of the semicircular section of the grooves is between 1 and 4 mm.

10. The device according to claim 6, in which the continuous relief is a groove of semicircular section or a rib of rounded, square, triangular, or trapezoidal section, and in which a diameter of the semicircular section of the grooves is between 1 and 4 mm and a height of the ribs is between 1 and 5 mm.

11. A method for forming mineral fibers by internal centrifuging associated with a high temperature gaseous attenuation, using a device having a fiber forming centrifuge, in which a material to be formed into fiber is poured into the fiber forming centrifuge rotating about a rotation axis, the centrifuge comprising:
an upper side of the centrifuge;
an annular wall pierced with a plurality of holes, the annular wall having the rotation axis as its axis of symmetry;
a rounding positioned between the annular wall and the upper side;

at least one row of one continuous relief or of discontinuous reliefs situated on an outer surface of the centrifuge, wherein at least one row of continuous or discontinuous reliefs extends, when the centrifuge is in a centrifuging position, along the annular wall, the rounding, or along the upper side of the centrifuge, close to the rounding; and an annular burner generating a high-temperature gaseous attenuation jet, wherein an outlet of the annular burner is situated above the at least one row of one continuous relief or of discontinuous reliefs of the centrifuge in a fiber-forming position, the gaseous attenuation jet is tangential to the annular wall of the centrifuge, and the at least one row of continuous or discontinuous reliefs are in the high-temperature gaseous attenuation jet that comes out of the burner, and wherein the at least one row is horizontal or inclined at an angle of more than 0° and less than 90° relative to the horizontal when the centrifuge is in the centrifuging position.

* * * * *